United States Patent [19]

Yoo et al.

[11] Patent Number: 5,513,255

[45] Date of Patent: Apr. 30, 1996

[54] METHOD FOR CONTROLLING OVERLOAD OF DISTRIBUTED PROCESSORS OF FULL ELECTRONIC SWITCHING SYSTEM

[75] Inventors: Chan H. Yoo; Byung S. Lee; Young S. Kim, all of Daejeon, Rep. of Korea

[73] Assignees: Electronics and Telecommunication Research Institute; Korea Telecommunications Authority, both of Rep. of Korea

[21] Appl. No.: 343,638

[22] Filed: Nov. 22, 1994

[30] Foreign Application Priority Data

Dec. 11, 1993 [KR]  Rep. of Korea .................. 1993-27368

[51] Int. Cl.$^6$ ................................................. H04M 3/00
[52] U.S. Cl. ........................ 379/133; 379/221; 379/279
[58] Field of Search .............................. 379/34, 113, 220, 379/221, 279, 134, 133

[56] References Cited

U.S. PATENT DOCUMENTS

| | | | |
|---|---|---|---|
| 4,511,762 | 4/1985 | Stockdale | 379/279 |
| 4,658,098 | 4/1987 | Wegmann | 379/113 |
| 4,809,318 | 2/1989 | Schoute | 379/279 |
| 4,974,256 | 11/1990 | Cyr et al. | 379/113 |
| 5,067,074 | 11/1991 | Farel et al. | 379/113 X |
| 5,295,183 | 3/1994 | Langlois et al. | 379/113 |
| 5,425,086 | 6/1995 | Hidaka et al. | 379/113 |

OTHER PUBLICATIONS

ITC 12, "Adaptation of the Overload Regulation Method Stator to Multiprocessor Controls and Simulation Results", Torino, Jun. 1988, seven pages.

"Two concepts for overload regulation in SPC switching systems: Stator and Tail", by G. Daisenberger, J. Oehlerich, and G. Wegmann, eight pages.

"System 12 Traffic Overload Control", by G. Morales Andres and M. Villen Altamirano, *Electrical Communication*, vol. 59, No. 1/2, 1985, pp. 74–79.

*Primary Examiner*—Jeffery Hofsass
*Assistant Examiner*—Daniel S. Hunter
*Attorney, Agent, or Firm*—Merchant, Gould, Smith, Edell, Welter and Schmidt

[57] ABSTRACT

A method for controlling an overload of distributed processors of a full electronic switching system, capable of automatically calculating the number of calls to be accepted for a current interval by use of the number of calls accepted for a previous interval and the number of standby processes of a call processing program so that only the number of calls corresponding to the number of services calculated is acceptable, thereby maintaining a stable service condition for an overload control interval, and capable of realizing a priority control depending on the type of call. The method includes the first step of executing a call processing delay monitoring process loaded in an access switching processor by a priority not higher than a call processing process, but higher than an operation and maintenance process, thereby monitoring an execution condition of the call processing process, the second step of executing an overload control process by a priority higher than the call processing process, thereby determining and controlling an overload occurring in the processor, and the third step of repeating a process for changing a CPU reference value infinite times when a demand for a change of the CPU reference value is generated from an operator after the call processing delay monitoring process and the overload control process have started.

9 Claims, 9 Drawing Sheets

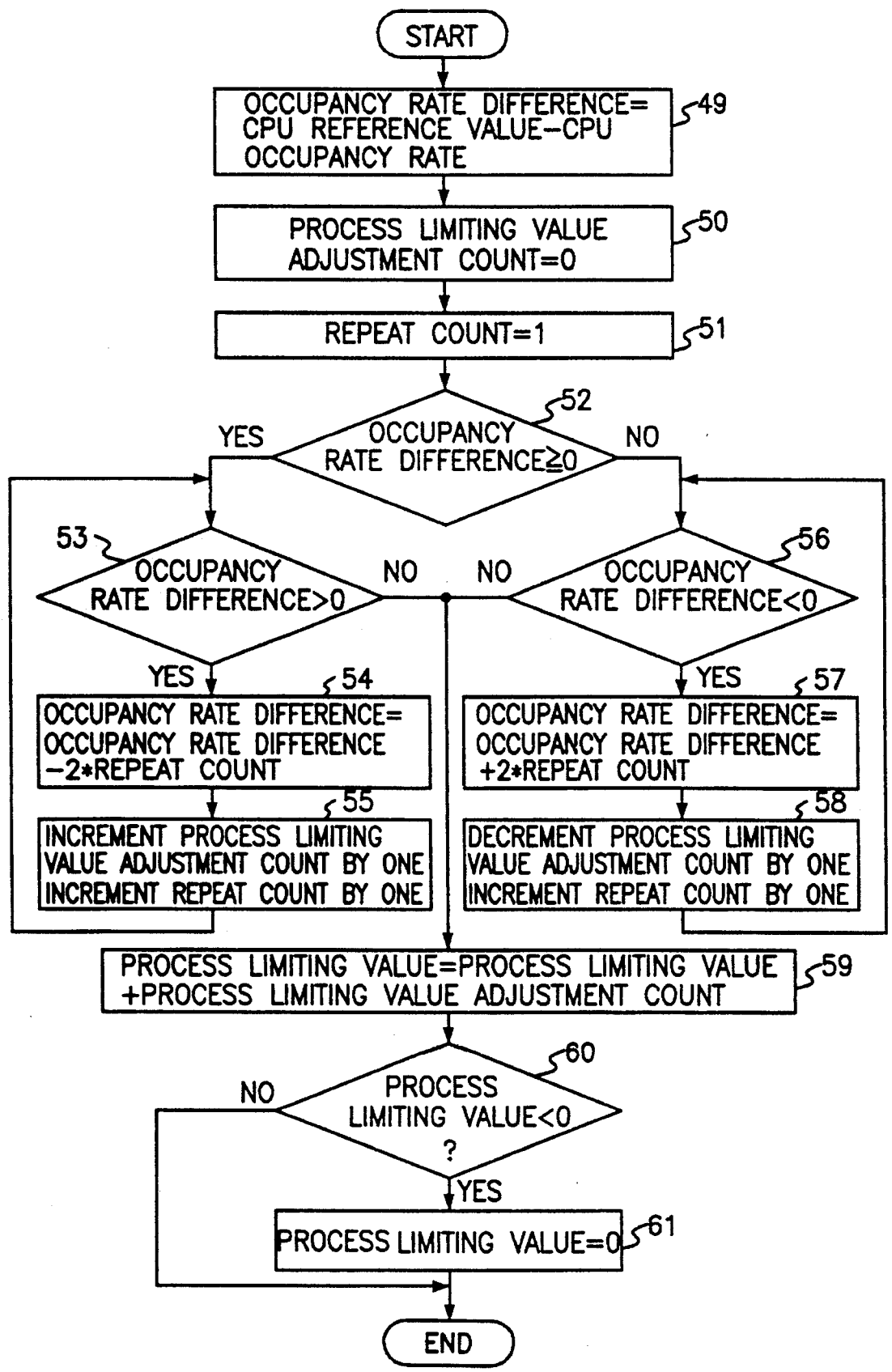

5,513,255

METHOD FOR CONTROLLING OVERLOAD OF DISTRIBUTED PROCESSORS OF FULL ELECTRONIC SWITCHING SYSTEM

BACKGROUND OF THE INVENTION

1. Field of the Invention

The present invention relates to a method for controlling an overload of distributed processors of a full electronic switching system, and more particularly to a method for controlling an overload occurring due to increased traffic in each distributed processors of a distributed processing system in which processing of subscriber calls and trunk calls are performed in a distributed manner.

2. Description of the Prior Art

Control for an overload is used to continuously provide a stable service by maximizing the efficiency of processors while minimizing a failure of service under an overload condition of the processors through a determination about and a control for the overload.

Conventional methods of controlling an overload in a switching system are classified into a method for determining the overload of the main processor and a method for controlling the overload of the main processor. As the method for determining the overload of the main processor, there have been known a method using a CPU occupancy rate, a method using a service queue of processors, a method using the number of services required in the processors. In the case of the method using the number of services, a determination that the overload of the main processor has occurred is made when the number of services is not less than a particular critical value. As the method for controlling the overload of the main processor, there have been known a method of determining a call service ratio between call services to be accepted and call services to be suppressed in a control interval, in accordance with the level of the overload, and a method of determining an interval of accepting all call services and an interval of suppressing all call services.

In the case of determining the overload only using the CPU occupancy rate, a determination that the overload has occurred may be made even if nothing interferes with the call processing service. This is because the CPU occupancy rate may be increased due to operation maintenance software irrespective of a call processing traffic. The erroneous determination results in a degradation in service quality.

In the cases of using the length of the service queue of each processor and the number of calls generated, an analysis of sufficient field operating data and a precisely simulated test are required to derive the critical value used for the determination of an overload. Furthermore, these methods have a disadvantage that the derived critical value should be varied depending on the type of call. The disadvantages encountered in the conventional methods of only utilizing the CPU occupancy rate, the service queue and the number of calls generated can be complemented by utilizing both the CPU occupancy rate and the monitoring for the execution delay of the processor.

In the method of controlling the overload, wherein new calls at a next interval are totally suppressed when the CPU occupancy rate is not less than the particular critical value and totally accepted when the CPU occupancy rate is less than the critical value, the control for the overload may be excessive because of an increased width between the increase in service and the decrease in service. On the other hand, the control method, wherein the suppression rate is increased as the level of the overload increases, has a possibility that an initial control may fail when an overload occurs due to an abrupt increase in load.

SUMMARY OF THE INVENTION

Therefore, an object of the invention is to solve the above-mentioned problems encountered in the prior art and, thus, to provide a method for controlling an overload of distributed processors of a full electronic switching system, capable of automatically calculating the number of calls to be accepted for a current interval by use of the number of calls accepted for a previous interval and the number of standby processes of a call processing program so that only the number of calls corresponding to the number of services calculated is acceptable, thereby maintaining a stable service condition for an overload control interval, and capable of realizing a priority control depending on the type of call.

In accordance with the present invention, this object can be accomplished by providing a method for controlling an overload of distributed processors of a full electronic switching system, comprising the steps of calculating a delay condition of a call processing process by use of a function obtained by a priority control of a multiplex processing process and a CPU occupancy rate, determining an overload caused by a call traffic by use of the CPU occupancy rate and the delay condition of the call processing process, calculating a call approval value for each interval, and accepting the number of calls corresponding to the calculated call approval value while suppressing the remaining calls. In order to determine about whether a proper control is being executed, the number of standby processes being ready for a call processing is calculated at the end of a control interval by use of data about a process execution condition provided by an execution management for the multiplex processing process. By always providing a proper number of standby call processing processes, it is possible to maintain an optimum condition upon performing the call control at intervals of a predetermined time.

BRIEF DESCRIPTION OF THE DRAWINGS

Other objects and aspects of the invention will become apparent from the following description of embodiments with reference to the accompanying drawings in which:

FIG. 8 is a flow chart illustrating a process limiting value adjusting routine of the access switching processor overload control process.

DETAILED DESCRIPTION OF THE PREFERRED EMBODIMENTS

Figure 1:
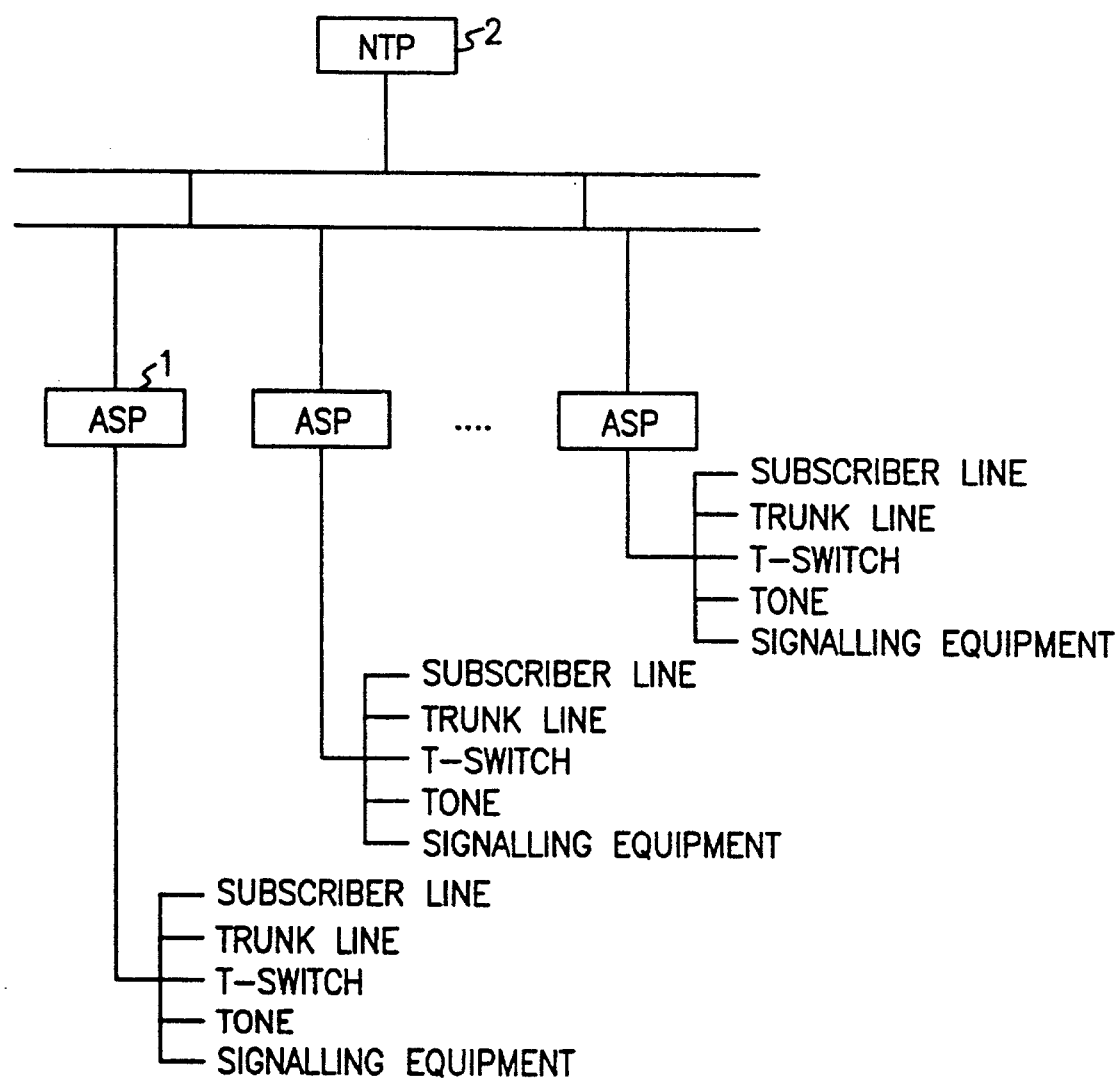
FIG. 1 is a block diagram illustrating a hardware system to which the present invention is applied.

FIG. 1 is a block diagram illustrating a hardware arrangement of distributed processors of a full electronic switching system to which the present invention is applied. As shown in FIG. 1, the system includes a plurality of access switching processors (ASPs) 1 distributively operating to sense generation of originating calls on subscriber lines and trunk lines and perform access of terminating calls, and a number translating processor (NTP) 2 adapted to translate numbers of an originating call and an input trunk call newly detected by optional ones of the ASPs 1, determine a call terminating ASP and an output trunk ASP on the basis of the result of the translation, and inform the determined ASPs of an establishment of call.

The ASPs 1, which are of the distributed type, are provided with subscriber lines and trunk lines in a distributed manner. Each ASP 1 also includes a time switch for a call processing service, a signaling equipment, and a tone equipment.

Figure 2:
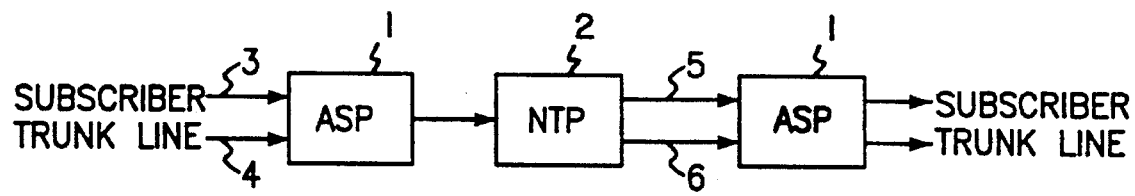
FIG. 2 is a block diagram illustrating a call sort employed in distributed processors in accordance with the present invention.

FIG. 2 is a block diagram illustrating a call sort employed in the distributed processors in accordance with the present invention. A call newly generated on a subscriber line in an optional ASP 1 is sorted as an originating call, while a call newly generated on an input trunk line is sorted as an input trunk call. In FIG. 2, the originating call is denoted by the reference numeral 3, while the input trunk call is denoted by the reference numeral 4. When the originating call or the input trunk call is generated, the NTP 2 translates the number of the generated call, selects an appropriate ASP 1 and a subscriber or trunk line, and inform the selected ASP of an establishment of call. In a position of the selected ASP, a call entering the subscriber line is sorted as a terminating call, while a terminating call through the trunk line is sorted as an output trunk call. In FIG. 2, the terminating call is denoted by the reference numeral 5, while the output trunk call is denoted by the reference numeral 6. An originating ASP may be identical to a terminating ASP. An overload depending on the traffic of each ASP is caused by originating calls, input trunk calls, and terminating and output trunk calls. When an overload occurs in an ASP, originating calls and input trunk calls are controlled by the ASP associated with the overload, while terminating and output trunk calls are controlled by the NTP. A suppression of calls is carried out in accordance with a priority established by a sort into three kinds of calls, that is, in the order of originating calls, input trunk calls, and terminating and output trunk calls. In the case of originating calls, a subscriber call having a priority is not suppressed.

Figure 3:
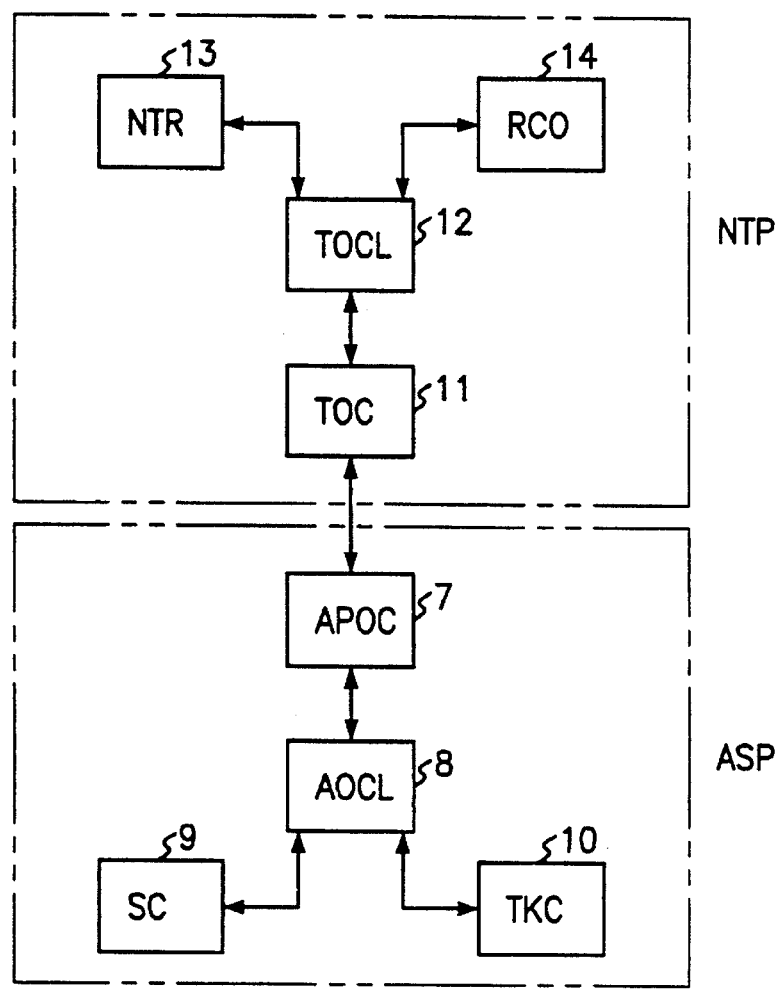
FIG. 3 is a block diagram illustrating a basic software in accordance with the present invention.

FIG. 3 is a block diagram illustrating a basic software operation in accordance with the present invention. As shown in FIG. 3, the basic software includes an ASP overload controller (APOC) 7 adapted to determine and control an overload of each of the distributed ASPs, an ASP overload control library (AOCL) 8 adapted to interface between an overload controller for the ASP and a subscriber controller or a trunk line controller. The subscriber controller (SC) 9 is adapted to achieve access of originating and terminating calls, generate an inquiry about an execution of a service for the originating call by use of the library, and normally execute the service when an approval of processing the originating call is made. The trunk controller (TKC) 10 is adapted to achieve access of input and output trunk calls, generate an inquiry about an execution of a service for the input trunk call by use of the library, and normally execute the service when an approval of processing the input trunk call is made. The basic software further includes a terminating and output trunk call controller (TOC) 11 loaded in the NTP 2 and adapted to receive overload generation information from the APOC 7 and achieve control for terminating and output trunk call. A terminating and output trunk control library (TOCL) 12 is adapted to interface between a number translation function and a trunk route control function and thereby achieve control for terminating and outputting trunk calls. The number translator (NTR) 13 is adapted to generate an inquiry about an execution of a call terminating service for a call terminating ASP by use of the TOCL 12 when a call terminating ASP is selected after the translation of the originating call, inform the call terminating ASP of an approval for the call terminating service to execute a normal establishment of call, and process a failure of calls when a suppression of terminating calls is made. The trunk route controller (RCO) 14 is adapted to select a bypass route of an ASP disassociated with the overload when a suppression of output trunk calls is required due to the overload of the call terminating ASP where the translated call is a call to be processed as output trunk call.

Figure 4:
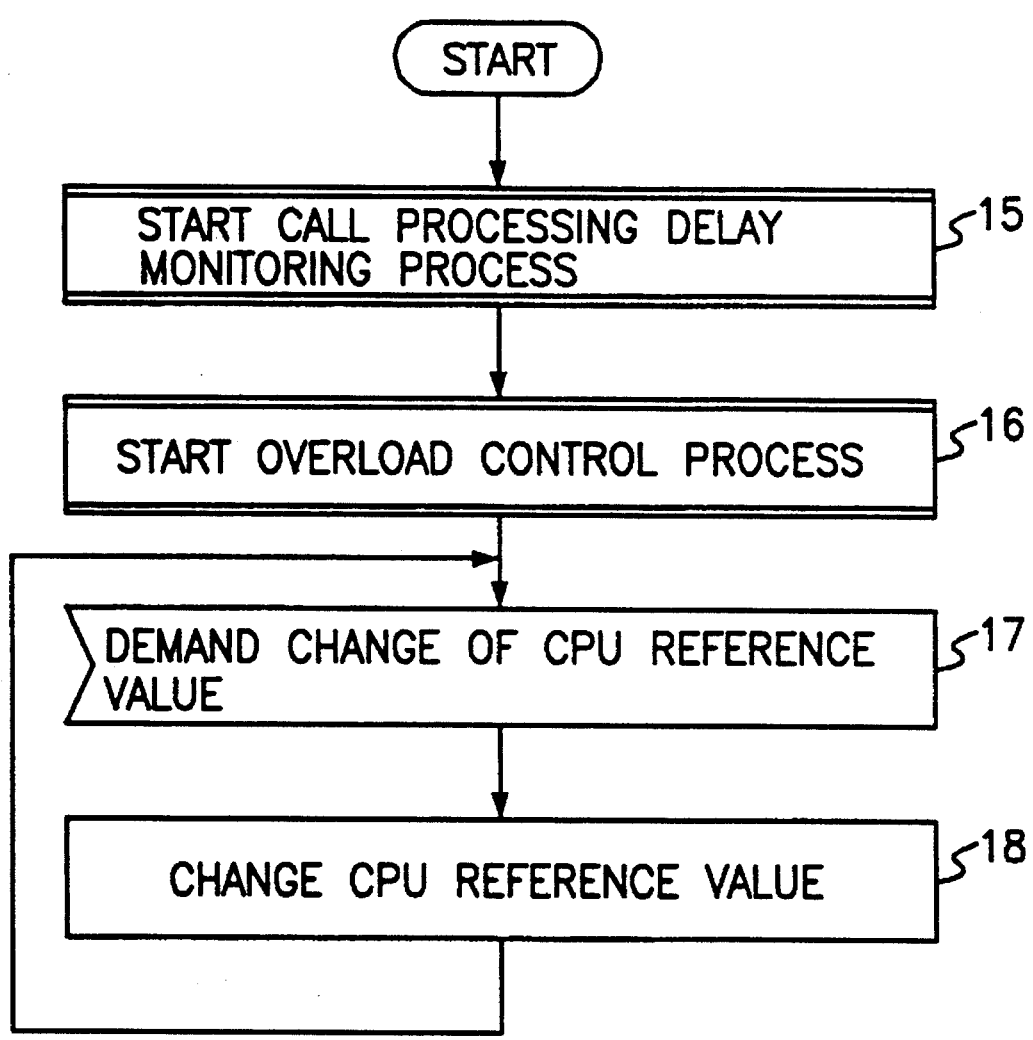
FIG. 4 is a flow chart illustrating a main procedure of an access switching processor overload controller in accordance with the present invention.

FIG. 4 is a flow chart illustrating a main procedure of the APOC 7 loaded in the corresponding ASP.

Once the APOC 7 is loaded into the ASP and starts, a call processing delay monitoring process is begun (Step 15). subsequently, an overload control process is begun (Step 16). The call processing delay monitoring process is adapted to monitor an execution condition of a call processing software and executed in accordance with its priority not higher than the priority of the call processing process, but higher than the priority of a operation and maintenance process. On the other hand, the overload control process for executing the determination about and the control of the overload of the ASP is executed in accordance with its priority higher than the priority of the call processing process. After starting the call processing delay monitoring process and the overload control process, a process of waiting for a signal from an operator requiring a change of a CPU reference value and changing the CPU reference value is repeatedly and continuously executed (Steps 17 and 18).

Figure 5:
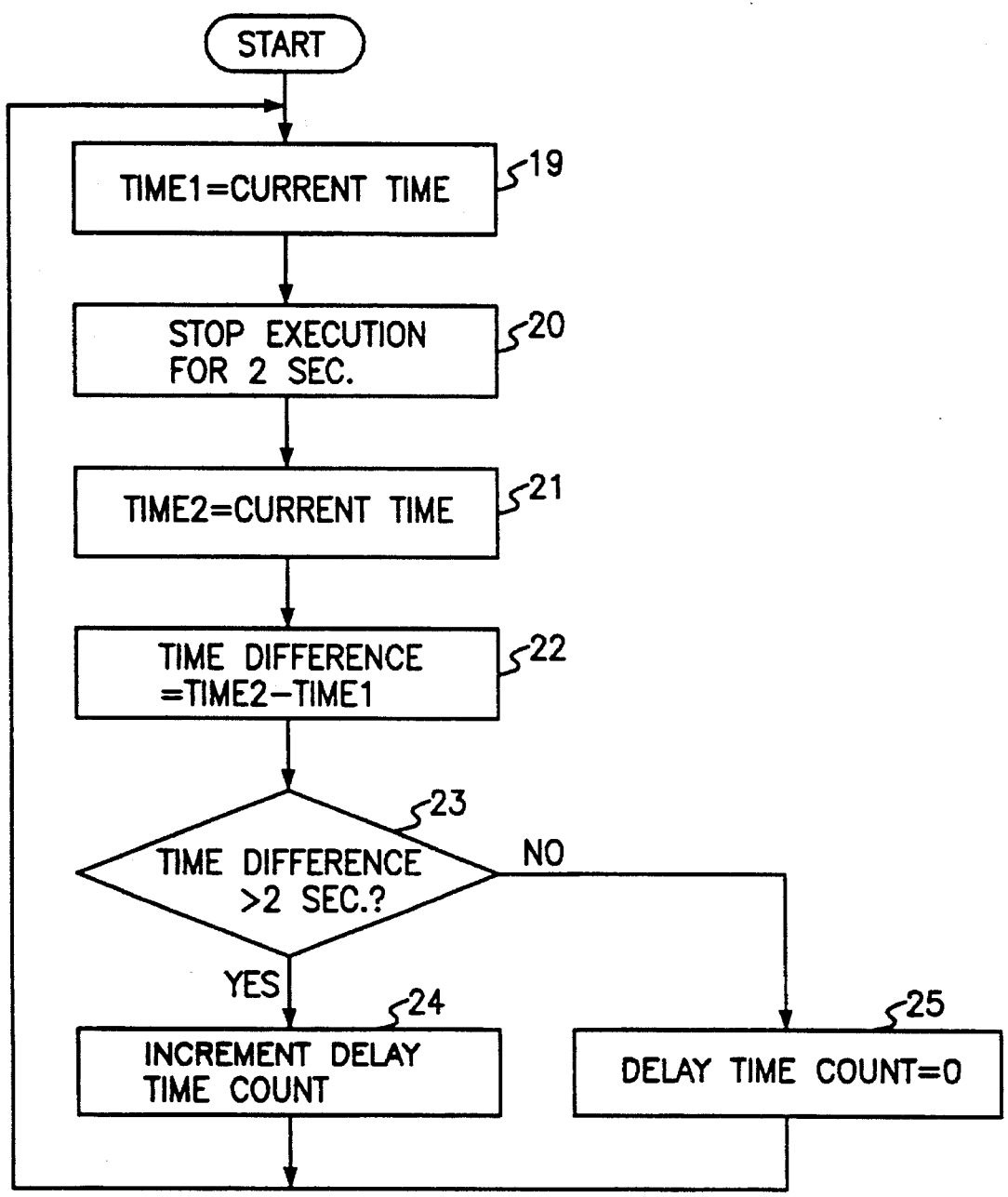
FIG. 5 is a flow chart illustrating a procedure of a call processing delay monitoring process of the access switching processor overload controller.

FIG. 5 is a flow chart illustrating a procedure of the call processing delay monitoring process of the ASP overload controller.

Just after the ASP overload controller starts, the call processing delay monitoring process is begun and repeatedly executed at intervals of 2 seconds. Once the call processing delay monitoring process starts, the current time is read (Step 19). Thereafter, the call processing delay monitoring process is maintained at an execution stop state for 2 seconds (Step 20). After the 2 seconds elapses, when the call processing delaymonitoring process starts again it reads the current time (Step 21). Subsequently, the time read before the execution stop state is deducted from the time currently read so as to derive a time difference (Step 22). A determination is then made about whether the derived time difference is more than 2 seconds (Step 23). When the time difference is more than 2 seconds, for example, due to an overload, a delay time count is incremented by one (Step 24). When the time difference is 2 seconds, the delay time count is set by zero (Step 25). The delay time count is indicative of the condition that the call processing process to be executed is at a standby state due to an increased call traffic.

Figure 6:
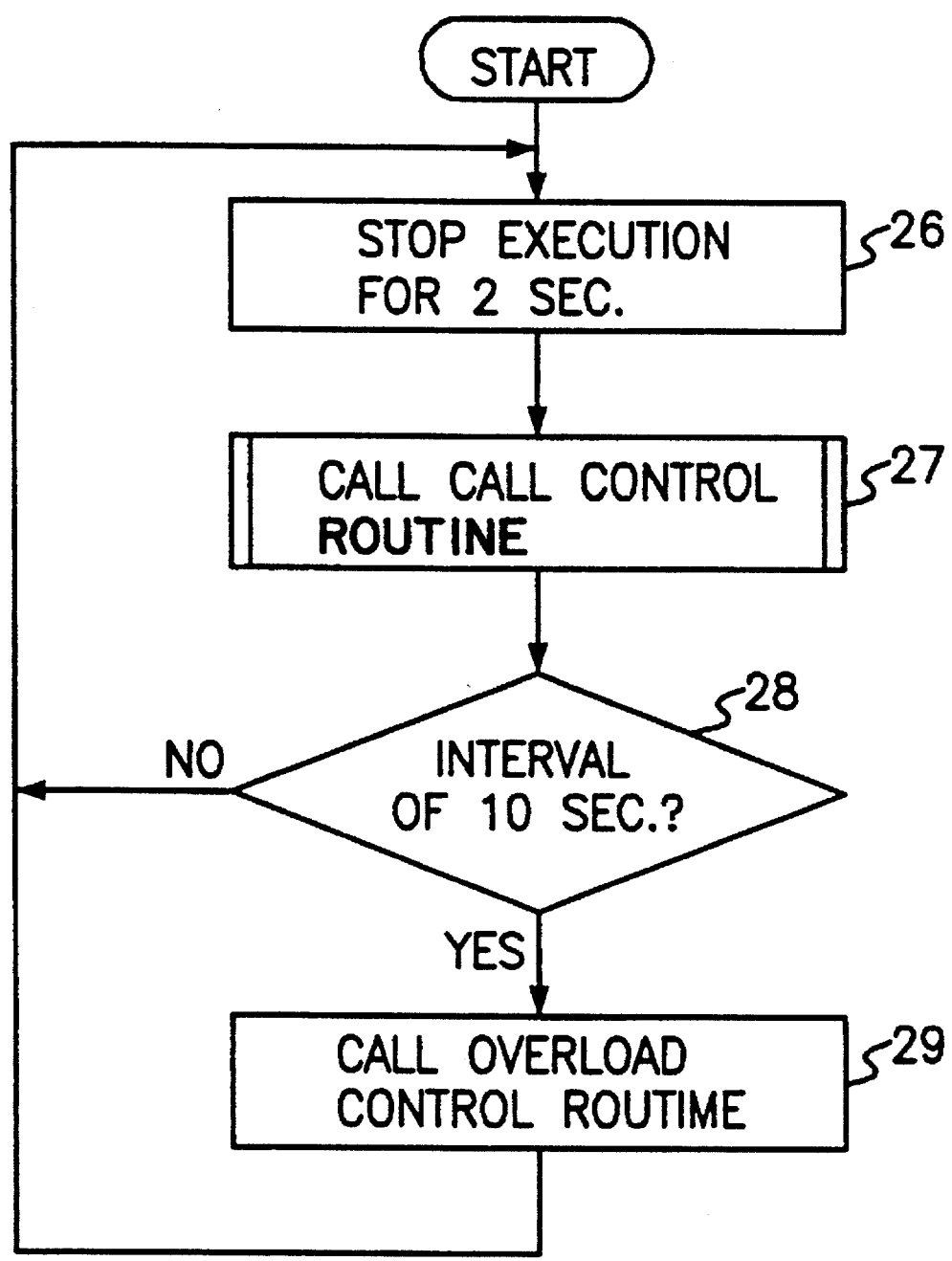
FIG. 6 is a flow chart illustrating a procedure of an overload control process of the access switching processor overload controller.

FIG. 6 is a flow chart illustrating a procedure of the overload control process of the ASP overload controller.

The overload control process is executed to control a call approval at intervals of 2 seconds and to adjust data about the overload determination and control at intervals of 10 seconds. Once the overload control process starts, it is maintained at an execution stop state for 2 seconds (Step 26). Thereafter, the overload control process starts again to call and execute a call control routine for calculating a call approval value to be used for a call control (Step 27). During the execution of the overload control process, an overload control routine for adjusting data about the overload determination and control is called at intervals of 10 seconds (Step 29). These functions are repeatedly executed an infinite number of times (i.e., in an infinite loop).

Figure 7A:
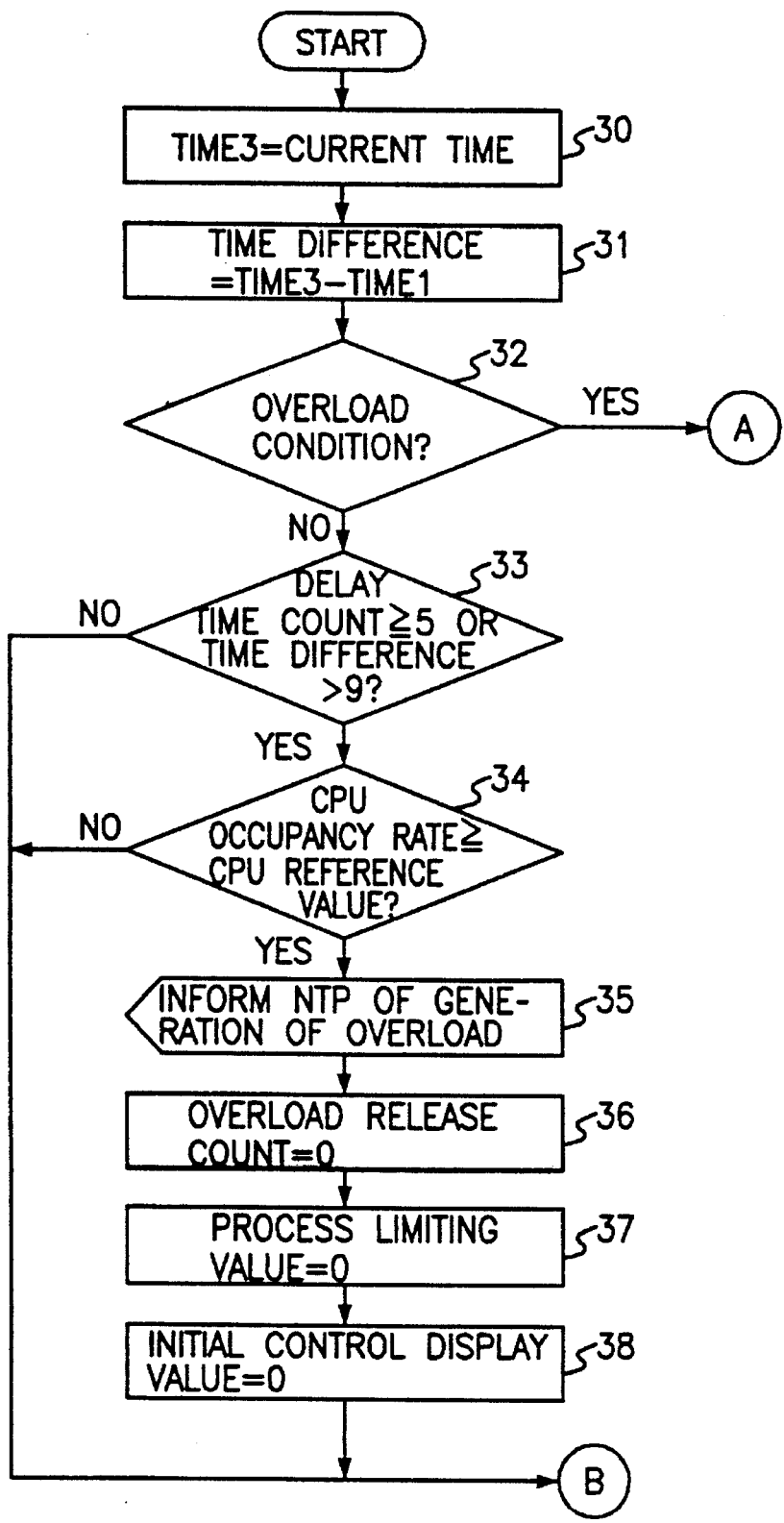
FIGS. 7A and 7B are flowcharts respectively illustrating the overload control routine of the access switching processor overload control process.
Figure 7B:
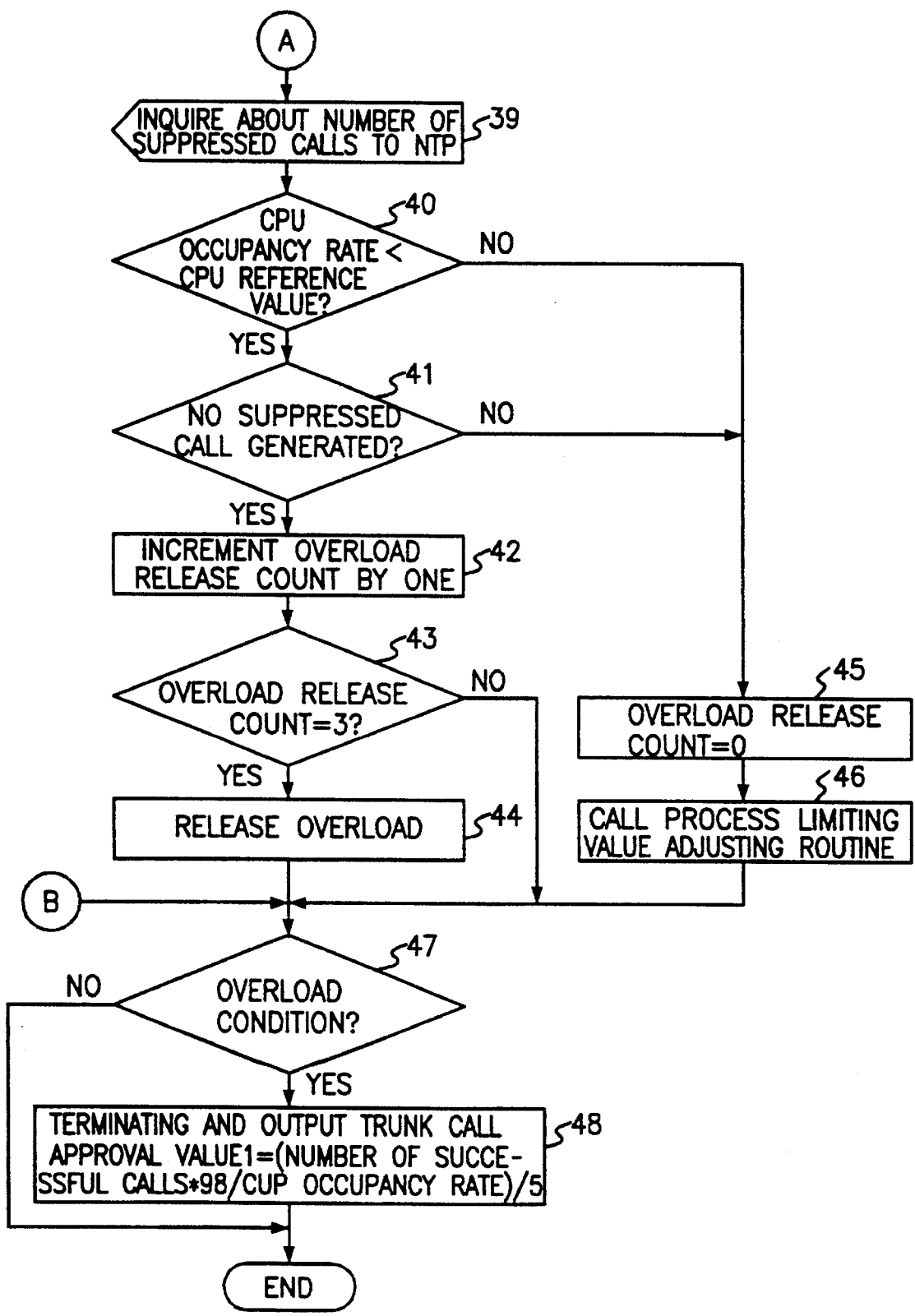

FIGS. 7A and 7B are flow charts respectively illustrating the overload control routine of the overload control process of the ASP overload controller.

The overload control process is called by the overload control process at intervals of 10 seconds to achieve the determination about and the control of the overload of the ASP. Upon being called, the overload control routine reads the current time to detect a delay condition of the call processing process (Step 30). Subsequently, a difference between the currently read time and the time finally read in the call processing delay monitoring process is derived (Step 31). A determination is then made about whether the ASP is under an overload condition (Step 32). When the ASP is not under an overload condition, a determination is made about whether the delay time count accumulated in the call processing delay monitoring process is not less than 5 or whether the derived time difference is more than 9 (Step 33). Where the delay time count accumulated in the call processing delay monitoring process is not less than 5 or where the derived time difference is more than 9, a determination is also made about whether a CPU occupancy rate of 10 seconds is not less than the CPU reference value (Step 34). If the CPU occupancy rate of 10 seconds is not less than the CPU reference value, a determination is then made that an overload has occurred. The NTP is informed of the occurrence of the overload (Step 35). Subsequently, an overload release count to be used upon releasing the overload is set by zero (Step 36). A process limiting value to be used for the call control is set by zero for an initialization (Step 37). Subsequently, an initial control display value indicative of an initiation of a new overload control is set by zero for an initialization (Step 38). The reason why the time difference is used in addition to the delay time count is because a delay condition of the call processing process should be determined by deriving the time difference in the overload control process having the priority higher than the priority of the call processing process since the call processing delay monitoring process may not be executed due to its lower priority when a severe overload has occurred. By monitoring the delay condition of the call processing process, it is possible to prevent the occupancy of the CPU at a high rate by the operation and maintenance program of the lower priority from being erroneously determined as the overload and to prevent an abrupt increase or decrease in load from being erroneously determined as the overload. The initial control display value is used to suppress all calls until standby call services in a service standby queue of a processor involving a new overload disappear. Where the determination that the overload has occurred is made at the step 32, an inquiry is made of the NTP about the number of calls suppressed for the current interval in order to check a terminating and output trunk call suppression condition obtained in the NTP (Step 39). In response to the inquiry, the NTP informs the number of suppressed calls at the step 39. Under the overload condition, a determination is then made about whether the CPU occupancy rate is less than the CPU reference (Step 40). Where the CPU occupancy rate is less than the CPU reference value, the number of suppressed calls is calculated by summing the number of originating and input trunk calls suppressed in the ASP and the number of terminating and output trunk calls suppressed in the ASP, in order to determine the decrease in CPU load as having been caused by a reduction in traffic or by a call suppression. On the basis of the result of the calculation, a determination is then made about whether no call suppressed has been generated (Step 41). Where no call suppressed has been generated, a determination is made that the decrease in load is caused by a decreased traffic. In this case, the overload release count is incremented by one (Step 42). A determination is then made about whether the incremented overload release count corresponds to 3 (Step 43). If the overload release count corresponds to 3, a determination is then made that the overload condition has been released, on the basis of the fact that no call suppressed has been generated for three successive times. The release of the overload is executed (Step 44). Where the CPU occupancy rate has been determined at the step 40 not to be less than the CPU reference or where a determination has been made at the step 41 that at least one call suppressed has been generated under the condition that the CPU occupancy rate is less than the CPU reference, the overload release count is set by zero (Step 45). A process limiting value adjusting routine is called to adjust the process limiting value to be used for the call process (Step 46). Thereafter, a determination is made about whether an overload condition has occurred (Step 47). When the overload condition has occurred, an approval value to be used upon determining a terminating and output trunk call approval value for a terminating and output trunk call control is derived. As the terminating and output trunk call approval value, one of the value calculated in the overload control routine and the value calculated in the call control routine is selectively used depending on a control condition. In the overload control routine, the approval value is calculated using the CPU occupancy rate and a successful call service value for an interval of 10 seconds. The successful call service value is indicative of the number of successful call services executed through the overload control for an interval of 10 seconds. Thereafter, the number of successful calls required to increase the current CPU occupancy rate up to 98% is calculated in order to use it as the terminating and output trunk call approval value (Step 48). Although the value resulted from the calculation includes the number of successful originating and input trunk calls, it is used as the terminating and output trunk call approval value so as to realize the priority of the terminating and output trunk calls. Since the value resulted from the calculation is based on the number of successful calls for 10 seconds, it is divided by 5 in order to apply it to the control interval of 2 seconds.

FIG. 8 is a flow chart illustrating the process limiting value adjusting routine of the ASP overload control process. The process limiting value is used for a determination about whether a call control being currently executed is proper. On the basis of the process limiting value, a determination is made about whether the call approval value is increased or decreased. The overload control routine calls for the process limiting value adjusting routine. Using a difference between the CPU occupancy rate and the CPU reference value, the process limiting value adjusting routine executes an increase or decrease in the process limiting value. For example, the process limiting value is adjusted to have a value of 1, 2, 3, 4, 5, 6, 7, 8, or 9 respectively depending on the occupancy rate difference of 2, 6, 12, 20, 30, 42, 56, 72, or 90. In accordance with the process limiting value adjusting routine, first, the CPU occupancy rate is deducted from the CPU reference value so as to derive the occupancy rate difference (Step 49). Thereafter, a process limiting value adjustment count is set by zero for an initialization (Step 50). A repeat count is also set by one for an initialization (Step 51). The process limiting value adjustment count is used to increase and decrease the process limiting value and thereby to adjust the process limiting value. On the other hand, the repeat count is used to increment and decrement the process limiting value adjustment coefficient by one. Subsequently, a determination is made about whether the occupancy rate difference is not less than zero (Step 52). When the occupancy rate difference is not less than zero, a process limiting value adjustment count for increasing the process limiting value is calculated. The calculation for the process limiting value adjustment count is repeatedly continued until the occupancy rate difference is not more than zero. In other words, a determination is made about whether the occupancy rate difference is more than zero (Step 53). When the occupancy rate difference is more than zero, an occupancy rate difference is calculated by deducting a value resulted from a multiply of the repeat count by 2 from the previous occupancy rate difference (Step 54). Subsequently, the process limiting value adjustment count and the repeat count are incremented by one (Step 55). The steps 53 to 55 are repeated until the occupancy rate difference is not more than zero. Where the occupancy rate difference is determined at the step 52 to be less than zero, a process limiting value adjustment count for decreasing the process limiting value is calculated. The calculation for the process limiting value adjustment count is repeatedly continued until the occupancy rate difference is not less than zero. In other words, a determination is made about whether the occupancy rate difference is less than zero (Step 56). When the occupancy rate difference is less than zero, an occupancy rate difference is calculated by adding a value resulted from a multiply of the repeat count by 2 to the previous occupancy rate difference (Step 57). The process limiting value adjustment count is decremented by one while the repeat count is incremented by one (Step 58). The steps 53 to 55 are repeated until the occupancy rate difference is not less than zero. After completing the calculation for the process limiting value adjustment count, a process limiting value is newly calculated by adding the process limiting value adjustment count to the previous process limiting value (Step 59). When the new process limiting value is less than zero (Step 60), it is set by zero (Step 61).

Figure 9:
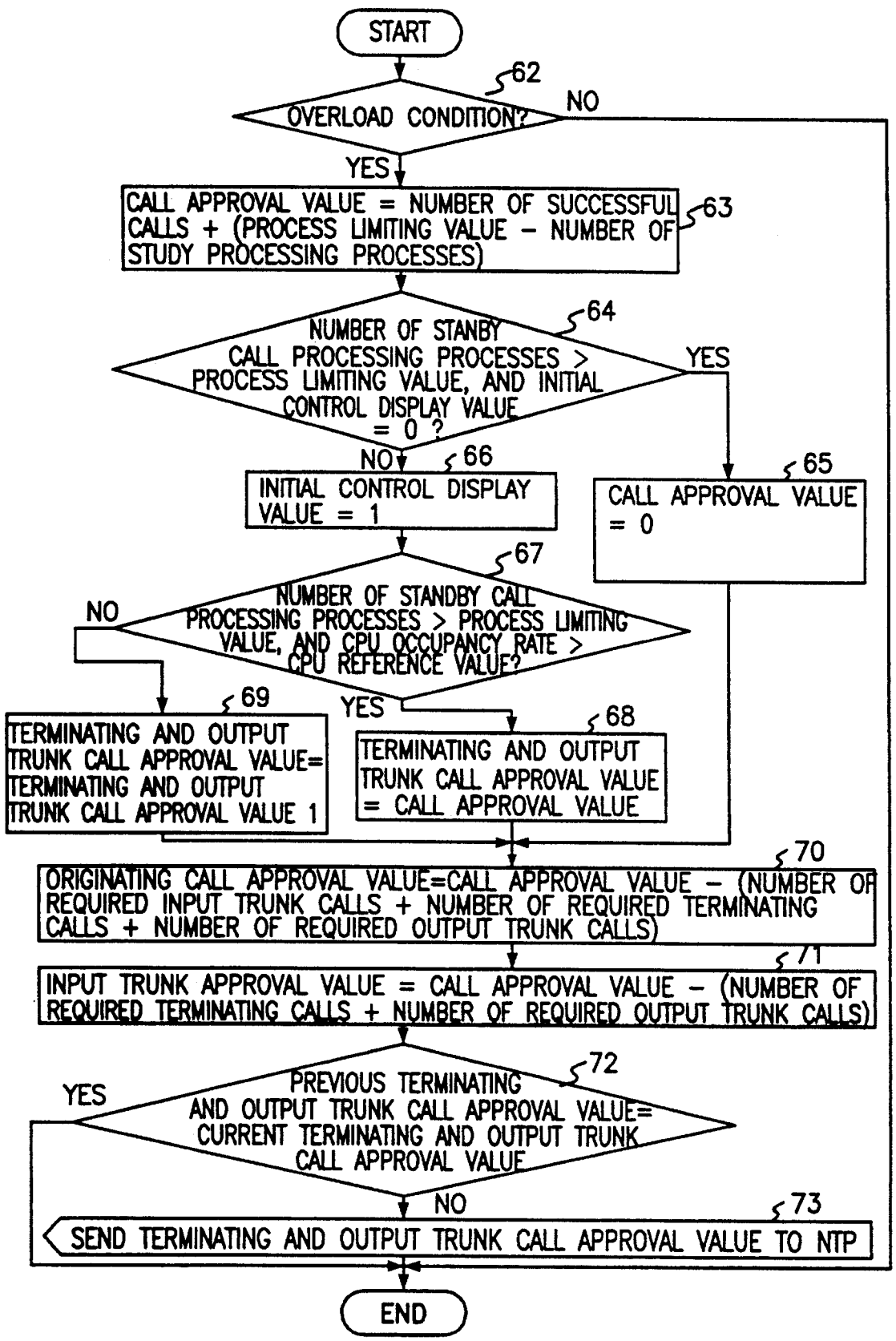
FIG. 9 is a flow chart illustrating the call control routine of the access switching processor overload control process.

FIG. 9 is a flow chart illustrating the call control routine of the ASP overload control process. The call control routine is adapted to calculate approval values respectively for originating calls, input trunk calls, and terminating and output trunk calls to be acceptable for an interval of 2 seconds. The overload control process calls the call control routine at intervals of 2 seconds. Once the call control routine is called, a determination is made about whether an overload condition of the ASP has occurred (Step 62). When the overload condition has occurred, a call approval value is calculated by summing the process limiting value and the number of successful calls accepted among originating and input trunk calls and terminating and output trunk calls for the interval of 2 seconds, and then deducting the number of standby call processing processes resulted from the control for the current interval from the value resulted from the summing (Step 63). The call approval value corresponds to a value obtained by summing numbers of originating calls, input trunk calls and terminating and output trunk calls. Thereafter, a determination is made about whether the number of standby call processing processes is more than the process limiting value and whether an initial control display value indicative of an occurrence of a new overload is zero (Step 64). Where the initial control display value is zero under a condition that the number of standby call processing processes is more than the process limiting value, the call approval value is set by zero because of the fact that the initial control for the overload control has not been completed yet (Step 65). At the step 65, a terminating and output trunk call approval value is also set by zero. Where the number of standby call processing processes is not more than the process limiting value or where the initial control has been completed, the initial control display value is set by one to display the completion of the initial control (Step 66). In this case, a determination is subsequently made about whether the number of standby call processing processes is more than the process limiting value and whether the CPU occupancy rate is more than the CPU reference value (Step 67). Where the CPU occupancy rate is more than the CPU reference value under a condition that the number of standby call processing processes is more than the process limiting value, a terminating and output trunk call approval value is set by the call approval value calculated in the call control routine (Step 68). On the other hand, where the number of standby call processing processes is not more than the process limiting value or where the CPU occupancy rate is not more than the CPU reference value, the terminating and output trunk call approval value is set by the terminating and output trunk call approval value calculated at the step 48 of the overload control routine, respectively (Step 69). The originating call approval value is then calculated by summing the number of input trunk calls, the number of terminating and output trunk calls respectively required for an interval of 2 seconds and then deducting the value resulted from the summing from the call approval value in order to ensure services corresponding, in number, to the sum of required input trunk calls, terminating calls and output trunk calls generated for the current interval (Step 70). Also, the input trunk call approval value is calculated by summing the number of required terminating calls and the number of required output trunk calls and then deducting the value resulted from the summing from the call approval value in order to ensure services for a next interval corresponding, in number, to the sum of required terminating calls and output trunk calls generated for the current interval (Step 71). After completing the calculation of the terminating and output trunk call approval value, the originating call approval value and the input trunk call approval value, a determination is made about whether the current terminating and output trunk call approval value corresponds to the previous terminating and output trunk call approval value (Step 72). When the current terminating and output trunk call approval value does not correspond to the previous terminating and output trunk call approval value, it is sent to a terminating and output trunk controller of the NTP because a control for the terminating and output trunk calls is performed in the NTP (Step 73).

As apparent from the above description, the present invention provides a method for controlling an overload of distributed ASPs of a full electronic switching system, capable of checking a CPU occupancy rate and an execution delay condition of a call processing process upon determining an overload of an ASP, thereby preventing an abrupt increase in CPU load caused by an operation and maintenance software and a temporary increase in call traffic from being determined as an overload. Accordingly, it is possible to reduce a failure of services caused by an erroneous overload determination. In accordance with the present invention, a process standby limiting value for adjusting the number of standby call processing processes is automatically calculated. Use of the process standby limiting value enables a design of a control system capable of maximizing the use of CPU while minimizing the limitation on service. As a result, it is possible to achieve a high service success rate of ASP even under the overload condition.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an overload of distributed access switching processors in a full electronic switching system in which subscriber and trunk lines are arranged in a distributed manner so that an access of calls and a setting of calls are executed in a distributed manner, comprising the steps of:

(A) executing a call processing delay monitoring process loaded in an access switching processor in accordance with a priority not higher than a call processing process, but higher than an operation and maintenance process, thereby monitoring an execution condition of the call processing process;

(B) executing an overload control process in accordance with a priority higher than the call processing process, thereby determining and controlling an overload occurring in the access switching processor; and (C) continuously repeating a process for changing a CPU reference value when a demand for a change of the CPU reference value is generated from an operator after the call processing delay monitoring process and the overload control process have started.

2. A method in accordance with claim 1, wherein the steps (A) comprises the steps of:

(a) reading a current time and then maintaining the call processing delay monitoring process at an execution stop state for a predetermined time;

(b) reading a current time after the execution stop state is released, and deducting the time read before the execution stop state from the current time, thereby deriving a time difference; and (c) incrementing a delay time count, indicative of a condition that the call processing process to be executed is at a standby state due to an increased call traffic, by one when the time difference is more than the predetermined time, while setting the delay time count by zero when the time difference is the predetermined time.

3. A method in accordance with claim 1, wherein the step (B) comprises the steps of:

(a) maintaining the overload control process at an execution stop state for a first predetermined time when the overload control process starts;

(b) calculating a call approval value after the execution stop state is released, and calling and executing a call control routine adapted to be used for a call control, on the basis of the calculated call approval value; and (c) setting a second predetermined time, and calling an overload control routine for adjusting data about the overload determination and control after the second predetermined time has elapsed.

4. A method in accordance with claim 3, wherein the step (b) further comprises the steps of:

(b-1) when an overload condition has occurred in the access switching processor, deriving a call approval value by summing a process limiting value and the number of successful calls accepted among originating calls, input trunk calls, terminating calls and output trunk calls for an interval of 2 seconds, and then deducting the number of standby call processing processes resulted from the control for a current interval from the value resulted from the summing, by the execution of the call control routine called at intervals of the first predetermined time;

(b-2) setting the call approval value by zero and the terminating and output trunk call approval value by zero when an initial control display value indicative of a generation of a new overload corresponds to a value of zero, indicative of the fact that an initial control for the overload control has not been completed yet, under a condition that the number of standby call processing processes is more than the process limiting value;

(b-3) setting the initial control display value by a value of one indicative of a completion of the initial control when the number of standby call processing processes is not more than the process limiting value or when the initial control has been completed, and then setting the terminating and output trunk call approval value by the call approval value calculated in the call control routine when the CPU occupancy rate is more than the CPU reference value under a condition that the number of standby call processing processes is more than the process limiting value, while setting the terminating and output trunk call approval value by the terminating and output trunk call approval value calculated in the overload control routine when the number of standby call processing processes is not more than the process limiting value or when the CPU occupancy rate is not more than the CPU reference value;

(b-4) calculating an originating call approval value for ensuring services corresponding, in number, to the sum of required input trunk calls, terminating calls and output trunk calls generated for the current interval;

(b-5) calculating an input trunk call approval value for ensuring services for a next interval corresponding, in number, to the sum of required terminating calls and output trunk calls generated for the current interval;

(b-6) sending the calculated terminating and output trunk call approval value to a terminating and output trunk controller of a number translation processor when it does not correspond to a terminating and output trunk call approval value calculated in a previous interval after completing the calculation of the terminating and output trunk call approval value, the originating call approval vlaue and the input trunk call approval value.

5. A method in accordance with claim 4, wherein the originating call approval value is calculated by summing the number of input trunk calls, the number of terminating calls and the number of output trunk calls respectively required for an interval of the first predetermined time and then deducting a value resulted from the summing from the set call approval value.

6. A method in accordance with claim 4, wherein the input trunk call approval value is calculated by summing the number of required terminating calls and the number of required output trunk calls and then deducting a value resulted from the summing from the set call approval value.

7. A method in accordance with claim 2, wherein the step (b) comprises the steps of:
  (a) maintaining the overload control process at an execution stop state for a first predetermined time when the overload control process starts;
  (b) calculating a call approval value after the execution stop state is released, and calling and executing a call control routine adapted to be used for a call control, on the basis of the calculated call approval value; and
  (c) setting a second predetermined time, and calling an overload control routine for adjusting data about the overload determination and control after the second predetermined time has elapsed.

8. A method in accordance with claim 7, wherein the setting step (c) further comprises the steps of:
  (c-1) reading a current time and deriving a difference between the current time and a time finally read in the call processing delay monitoring process to detect a delay condition of the call processing process, thereby determining whether the access switching processor has been under an overload condition;
  (c-2) when the access switching processor has been determined at the step (c-1) not to be under the overload condition and when the CPU occupancy rate of the second predetermined time is not less than the CPU reference value under a condition that a delay time count accumulated in the call processing delay monitoring process is not less than a predetermined value or under a condition that the derived time difference is more than a predetermined second time, making a determination that an overload has occurred, informing a number translation processor of the determination that the overload has occurred, setting an overload release count to be used to release the overload by zero, setting a process limiting value to be used for the call control by zero for an initialization, and setting an initial control display value by zero for an initialization;
  (c-3) when the access switching processor has been determined at the step (c-1) to be under the overload condition, inquiring of the number translation processor about the number of calls suppressed for a current interval in order to check a terminating and output trunk call suppression condition obtained in the number translation processor, and receiving the number of suppressed calls from the number translation processor;
  (c-4) when the access switching processor has been determined at the step (c-1) not to be under the overload condition and when the CPU occupancy rate of the second predetermined time is less than the CPU reference value, calculating the number of suppressed calls by summing the number of originating and input trunk calls suppressed in the access switching process and the number of terminating and output trunk calls suppressed in the access switching process, and making a determination that a decrease in load has occurred due to a decrease in traffic, if the number of suppressed calls is zero, while incrementing the overload release count by one;
  (c-5) when the overload release count corresponds to 3, making a determination that the overload condition has been released on the basis of the fact that no call suppressed has been generated for three successive times;
  (c-6) when the CPU occupancy rate is not less than the CPU reference or when at least one call suppressed has been generated under the condition that the CPU occupancy rate is less than the CPU reference, setting the overload release count by zero and calling a process limiting value adjusting routine to adjust the process limiting value to be used for the call control; and
  (c-7) determining whether the access switching processor has been under an overload condition, and deriving a call approval value to be used upon determining a terminating and output trunk call approval value for a terminating and output trunk call control.

9. A method in accordance with claim 8, wherein the process limiting value adjustment at the step (c-6) comprises the steps of:
  (a) deducting the CPU occupancy rate from the CPU reference value to derive an occupancy rate difference, setting a process limiting value adjustment count by zero for an initialization, and setting a repeat count by one for an initialization;
  (b) when the occupancy rate difference is not less than zero, calculating a process limiting value adjustment count for increasing the process limiting value by calculating an occupancy rate difference resulted from a deduction of a value resulted from a multiply of a repeat count by 2 from a previous occupancy rate difference and then incrementing the process limiting value adjustment count and the repeat count by one, and repeating the calculation for the process limiting value adjustment count until the occupancy rate difference is not more than zero;
  (c) when the occupancy rate difference is less than zero, calculating a process limiting value adjustment count for decreasing the process limiting value by calculating a occupancy rate difference resulted from an addition of a value resulted from a multiply of a repeat count by 2 to a previous occupancy rate difference and then decrementing the process limiting value adjustment count by one while incrementing the repeat count by one, and repeating the calculation for the process limiting value adjustment count until the occupancy rate difference is not less than zero; and
  (d) calculating a new process limiting value by adding the process limiting value adjustment count to a previous process limiting value after completing the calculation for the process limiting value adjustment count, and setting the calculated process limiting value by zero when it is less than zero.

* * * * *